(12) United States Patent
Murakami et al.

(10) Patent No.: US 11,396,992 B2
(45) Date of Patent: Jul. 26, 2022

(54) VEHICULAR LIGHTING DEVICE

(71) Applicant: KOITO MANUFACTURING CO., LTD., Tokyo (JP)

(72) Inventors: Kentarou Murakami, Shizuoka (JP); Atsushi Uesugi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 97 days.

(21) Appl. No.: 16/879,938

(22) Filed: May 21, 2020

(65) Prior Publication Data
US 2020/0378577 A1    Dec. 3, 2020

(30) Foreign Application Priority Data

May 31, 2019 (JP) .............................. JP2019-102160

(51) Int. Cl.
| | |
|---|---|
| *F21S 41/675* | (2018.01) |
| *F21S 41/14* | (2018.01) |
| *F21S 41/32* | (2018.01) |
| *F21V 23/00* | (2015.01) |
| *F21S 41/25* | (2018.01) |
| *F21W 102/13* | (2018.01) |
| *F21Y 115/00* | (2016.01) |

(52) U.S. Cl.
CPC ............ *F21S 41/675* (2018.01); *F21S 41/14* (2018.01); *F21S 41/32* (2018.01); *F21V 23/003* (2013.01); *F21S 41/25* (2018.01); *F21W 2102/13* (2018.01); *F21Y 2115/00* (2016.08)

(58) Field of Classification Search
CPC ..................................................... F21S 41/675
See application file for complete search history.

(56) References Cited

U.S. PATENT DOCUMENTS

| | | | |
|---|---|---|---|
| 2008/0203946 A1 | 8/2008 | Ito et al. | |
| 2014/0042325 A1 | 2/2014 | Yamamura | |
| 2017/0282786 A1* | 10/2017 | Toda | ........................ F21S 41/39 |

(Continued)

FOREIGN PATENT DOCUMENTS

| | | |
|---|---|---|
| CN | 107107809 A | 8/2017 |
| CN | 107960069 A | 4/2018 |

(Continued)

OTHER PUBLICATIONS

First Office Action dated Nov. 3, 2021, issued in Chinese Application No. 202010474864.2.

*Primary Examiner* — Sean P Gramling
(74) *Attorney, Agent, or Firm* — Sughrue Mion, PLLC

(57) ABSTRACT

A vehicular lighting device includes a scanning light source that includes a semiconductor light source and a motor, and scans a region in front of the lighting device, with light emitted from the semiconductor light source, in accordance with motion of the motor, and a lighting circuit that changes the light quantity of the semiconductor light source in synchronization with the motion of the motor, during a normal lighting period, so as to obtain a predetermined light distribution pattern. The lighting circuit starts the motion of the motor, in response to a lighting command for headlight flashing during a stop period of the motor, and continuously lights the semiconductor light source asynchronously with the motion of the motor, during a start-up period that precedes the normal lighting period.

5 Claims, 11 Drawing Sheets

(56) References Cited

U.S. PATENT DOCUMENTS

| | | |
|---|---|---|
| 2018/0043820 A1 | 2/2018 | Murakami et al. |
| 2018/0099604 A1 | 4/2018 | Mouri et al. |
| 2018/0335192 A1 | 11/2018 | Tanaka et al. |
| 2019/0120454 A1 | 4/2019 | Mouri et al. |
| 2020/0238892 A1 | 7/2020 | Maruyama et al. |

FOREIGN PATENT DOCUMENTS

| | | |
|---|---|---|
| CN | 109668116 A | 4/2019 |
| CN | 109708070 A | 5/2019 |
| JP | 2008-205357 A | 9/2008 |
| JP | 2010-006109 A | 1/2010 |
| JP | 2012-224317 A | 11/2012 |
| WO | 2016/167250 A1 | 10/2016 |

* cited by examiner

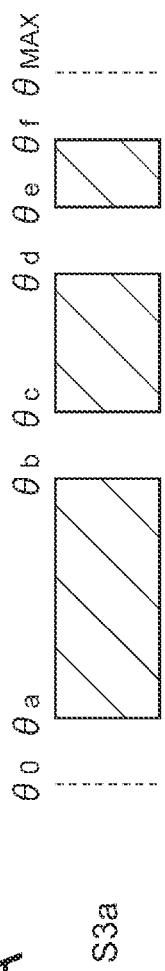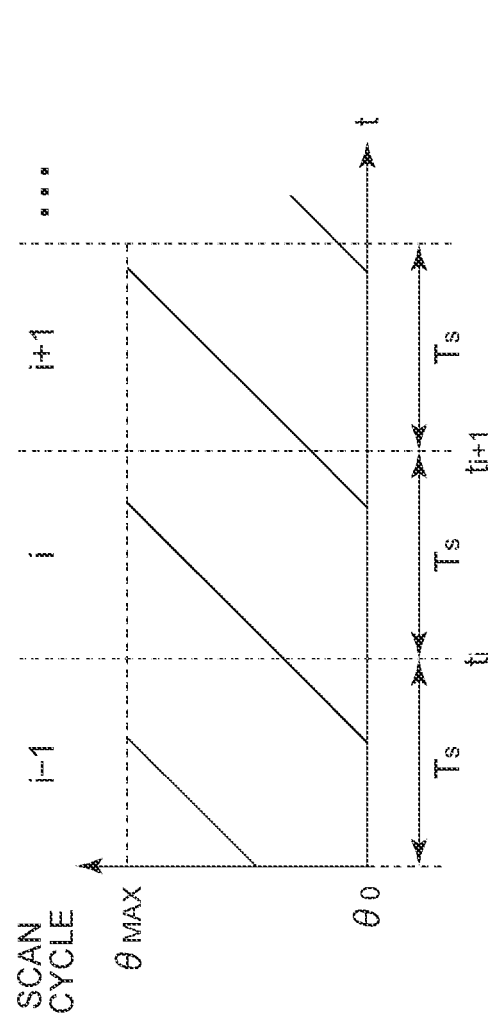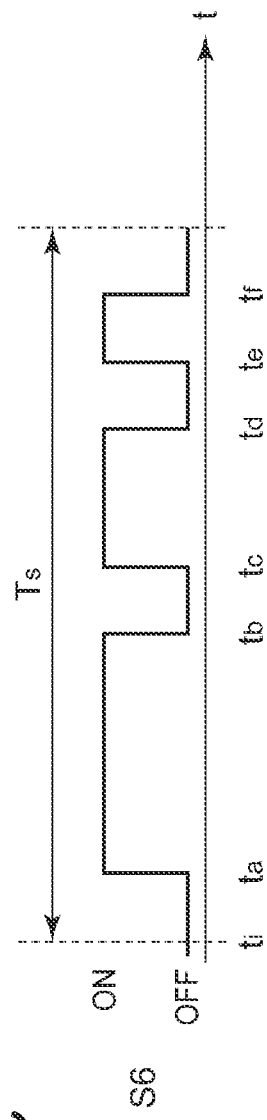
FIG. 3A
FIG. 3B
FIG. 3C

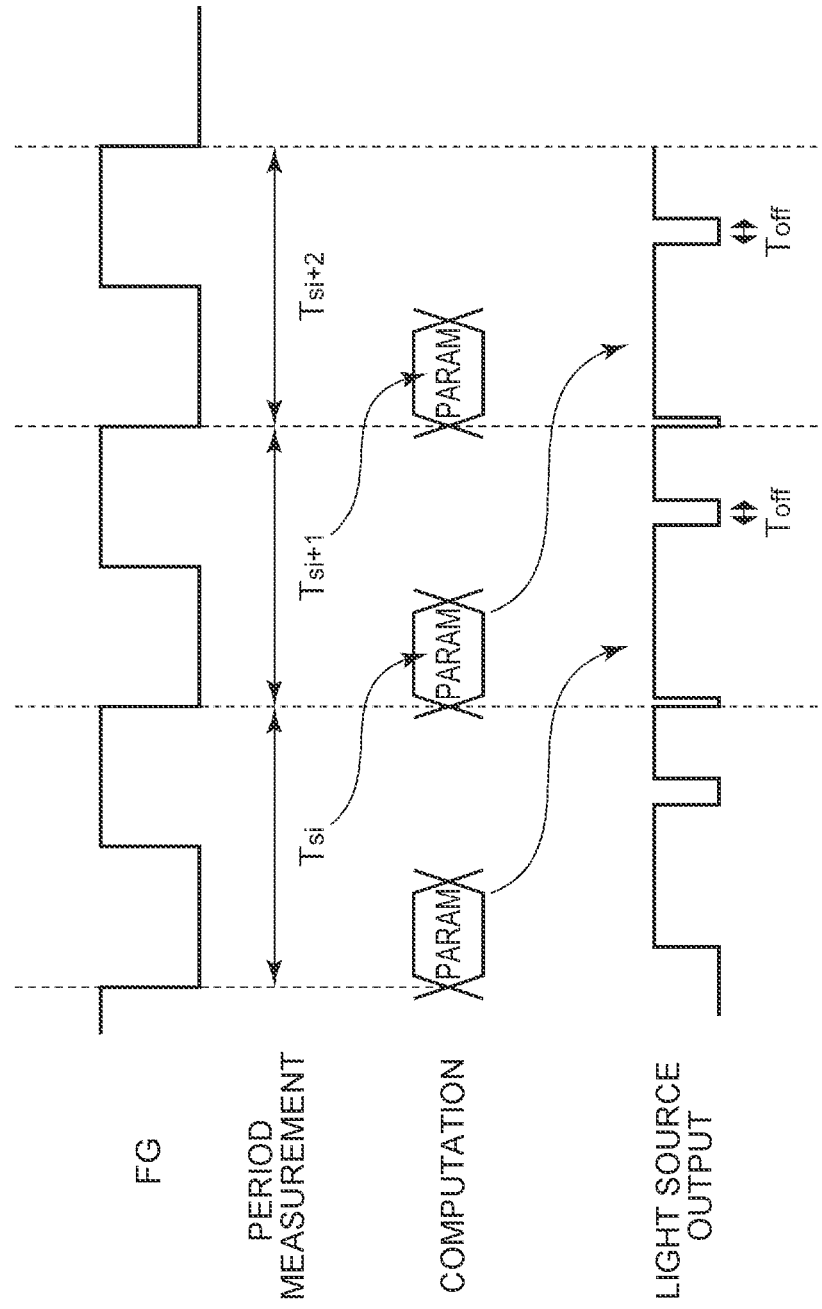

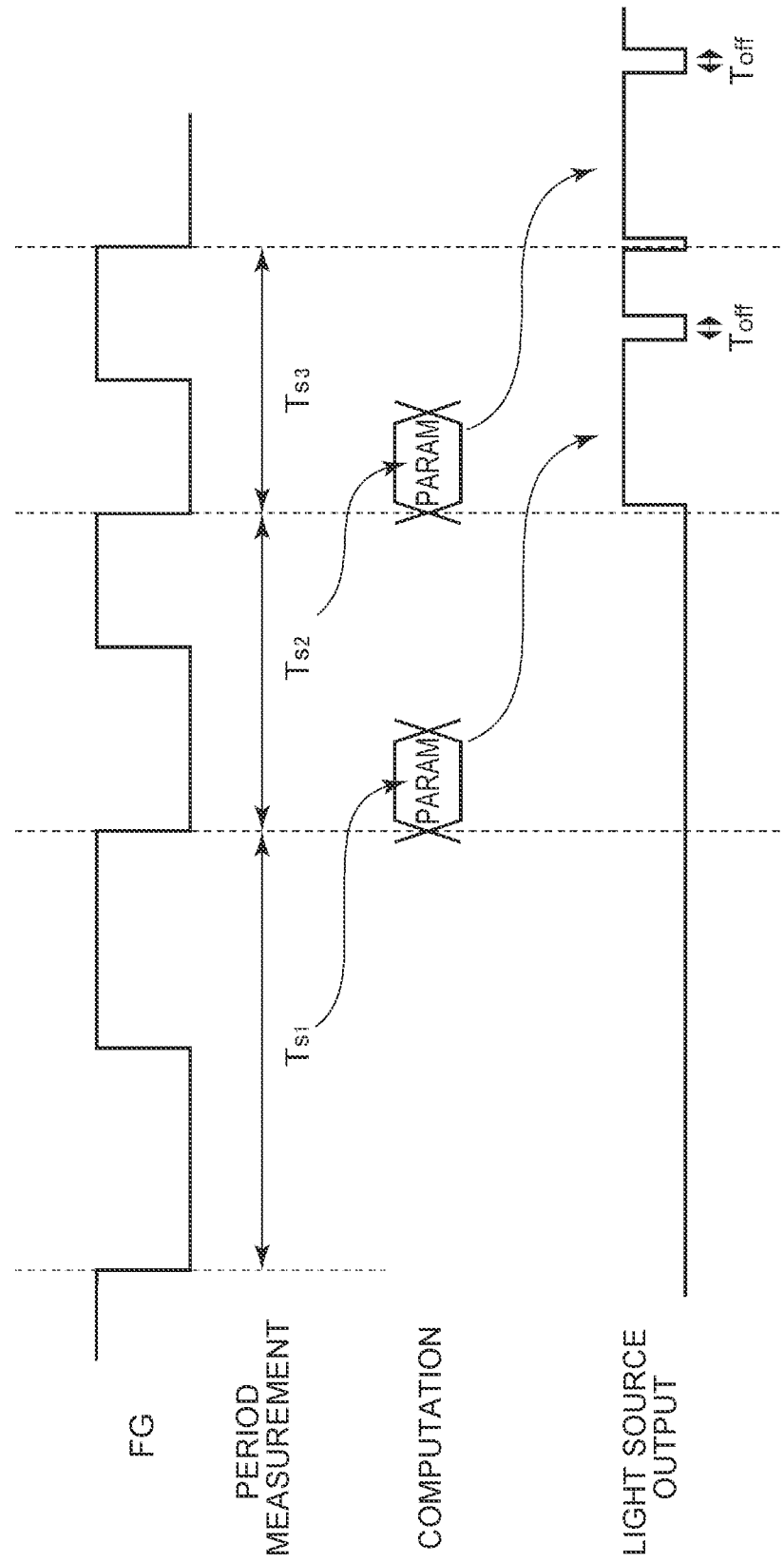

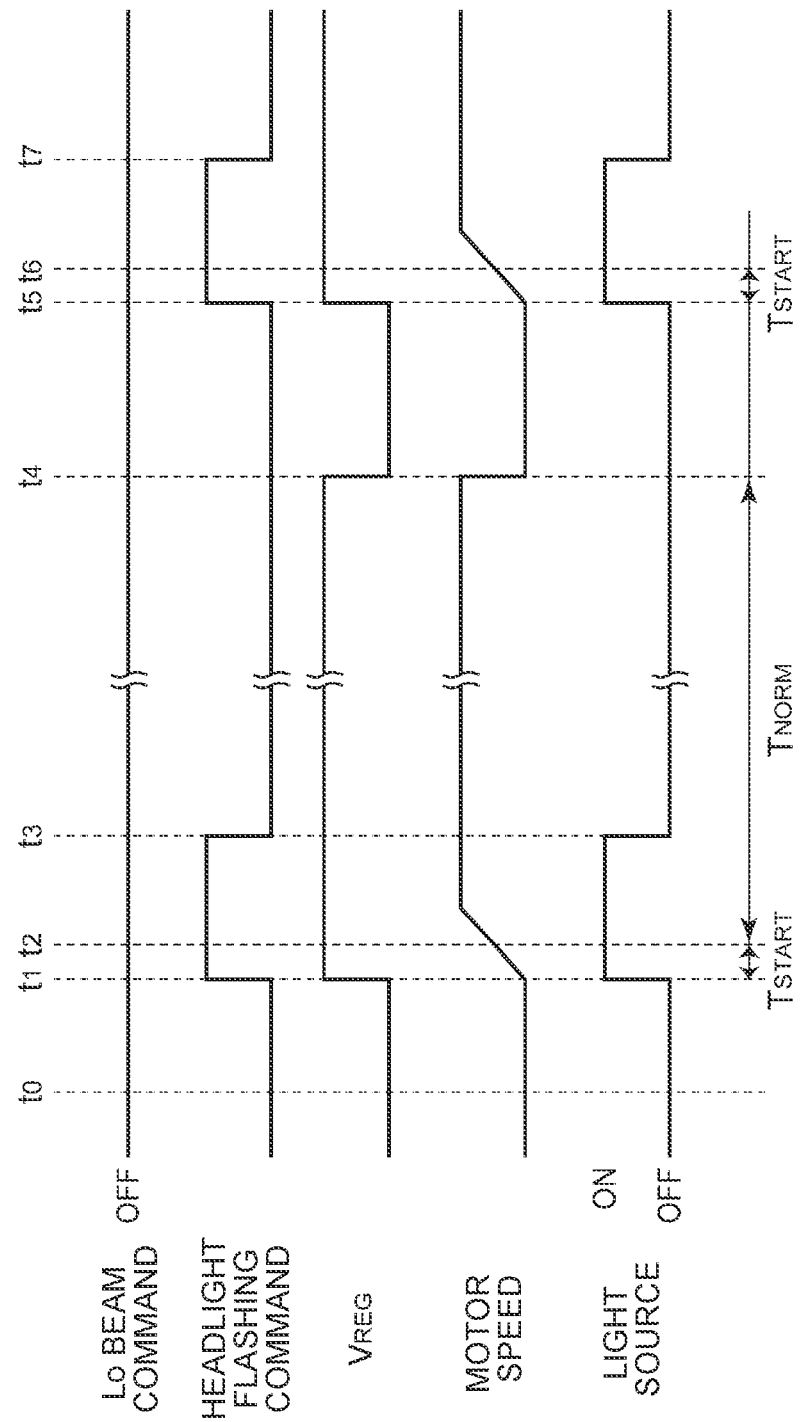

VEHICULAR LIGHTING DEVICE

CROSS-REFERENCE TO RELATED APPLICATION

This application claims priority to Japanese Patent Application No. 2019-102160 filed on May 31, 2019, incorporated herein by reference in its entirety.

BACKGROUND

1. Technical Field

The disclosure relates to a vehicular lighting device used in an automobile, or the like.

2. Description of Related Art

The vehicular lighting device is generally able to switch between a low-beam mode and a high-beam mode. Low beams are adapted to illuminate an area close to the vehicle with a predetermined illumination intensity, and the light intensity distribution is specified so as not to impart glare to an oncoming vehicle or preceding vehicle. The low beams are mainly used when the vehicle travels in town or urban areas. On the other hand, high beams are adapted to illuminate a wide range or far area in front of the vehicle with a relatively high illumination intensity, and are mainly used when the vehicle travels at a high speed on a road where the number of oncoming vehicles and preceding vehicles is small. Thus, the high beams have a higher level of visibility, and can be more easily seen by the driver, as compared with the low beams, but have a problem that it may impart glare to a driver of a preceding vehicle or a pedestrian present in front of the vehicle.

In recent years, an ADB (Adaptive Driving Beam) technology has been proposed with which the light distribution pattern of high beams is dynamically and adaptively controlled, based on surrounding conditions of the vehicle. With the ADB technology, the presence or absence of a preceding vehicle, oncoming vehicle, or pedestrian in front of the vehicle is determined, and the light intensity is reduced in a region corresponding to the vehicle or pedestrian, so as to reduce glare imparted to the vehicle or pedestrian.

As a method of implementing the ADB function, a shutter method in which an actuator is controlled, rotary method, LED array method, and others have been proposed. In the shutter method or rotary method, the width of a non-illuminated region (light blocked region) can be continuously changed, but the number of the non-illuminated region(s) is limited to one. In the LED array method, two or more non-illuminated regions can be set, but may be discrete ones since the width of each non-illuminated region is restricted by the width of irradiation of an LED chip.

The applicant of this application has proposed a scan method, as an ADB method that can solve the above problems (see, for example, Japanese Unexamined Patent Application Publications Nos. 2012-224317, 2010-6109 (JP 2012-224317 A, JP 2010-6109 A), and WO 2016/167250). According to the scan method, light is incident on a rotating reflector (blade), and the reflector reflects the incident light at an angle corresponding to the rotational position of the reflector, so as to scan a region in front of the vehicle with the reflected light. During scanning, turn-on and turn-off of a light source and its luminance are changed according to the rotational position of the reflector, so that a desired light distribution pattern is formed in the region in front of the vehicle.

SUMMARY

This disclosure provides a vehicular scanning lighting device, of which the response to headlight flashing operation is improved.

A vehicular lighting device according to one aspect of the disclosure includes a scanning light source and a lighting circuit. The scanning light source includes a semiconductor light source and a motor, and is configured to scan a region in front of the lighting device, with light emitted from the semiconductor light source, in accordance with motion of the motor. The lighting circuit is configured to change a light quantity of the semiconductor light source in synchronization with the motion of the motor, during a normal lighting period, so as to obtain a predetermined light distribution pattern. The lighting circuit is configured to start the motion of the motor, in response to a lighting command for headlight flashing during a stop period of the motor, and continuously light the semiconductor light source asynchronously with the motion of the motor, during a start-up period that precedes the normal lighting period.

It is to be understood that any combination of the constituent elements as described above, and the constituent elements or expressions of the disclosure, which are replaced with each other among a method, device, system, etc., are also in effect as embodiments of the disclosure.

According to the above aspect of the disclosure, the response of the vehicular scanning lighting device to headlight flashing operation can be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3A to FIG. 3C are views describing generation of a light control signal;

FIG. 4 is a view illustrating the control sequence of a light source when a motor is stably rotated;

FIG. 5 is a view illustrating the control sequence of the light source at the start of rotation of the motor;

FIG. 8 is another time chart describing operation of the vehicular lighting device of FIG. 2;

DETAILED DESCRIPTION OF EMBODIMENTS

Figure 1:
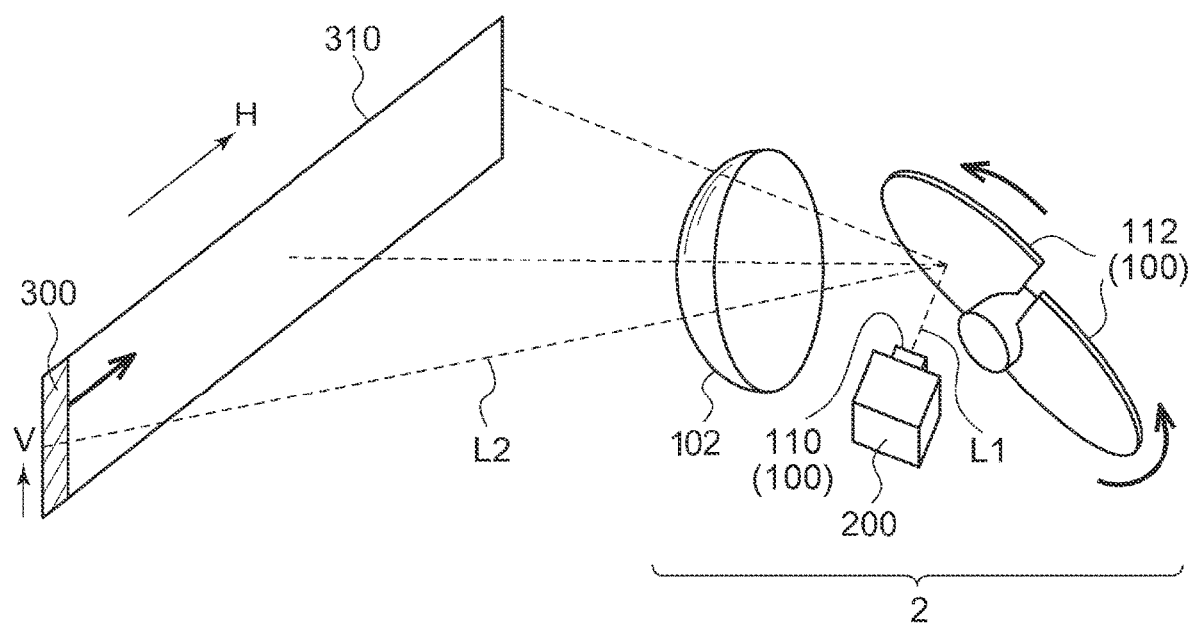
FIG. 1 is a perspective view schematically showing a vehicular lighting device according to one embodiment.

One preferred embodiment of the disclosure will be described with reference to the drawings. The same reference numerals or signs are assigned to the same or equivalent constituent elements, members, process steps shown in each drawing, and these elements and others will not be repeatedly described. This embodiment is not intended to limit the disclosure, but is merely exemplary, and all features described in the embodiment and combinations thereof are not necessarily essential to the disclosure.

In this specification, a "condition in which a member A is connected to a member B" refers not only to the case where the member A and the member B are physically and directly connected to each other, but also to the case where the member A and the member B are indirectly connected to each other, via another member that does not have a substantial influence on an electrically connected state of these members A, B, or does not impair the function and effect provided by coupling of these members A, B.

Similarly, a "condition in which a member C is provided between a member A and a member B" refers not only to the case where the member A and the member C, or the member B and the member C are directly connected to each other, but also to the case where these members are indirectly connected to each other, via another member that does not have a substantial influence on an electrically connected state of these members, or does not impair the function and effect provided by coupling of these members.

FIG. 1 is a perspective view schematically showing a vehicular lighting device 2 according to the embodiment. The vehicular lighting device 2 of FIG. 1 has the ADB (Adaptive Driving Beam) function of scan type, and forms a wide variety of light distribution patterns (high beams) in a region in front of the vehicle. The vehicular lighting device 2 is also turned on when the driver performs headlight flashing operation. The vehicular lighting device 2 principally includes a scanning light source 100, a projector lens 102, and a lighting circuit 200.

The scanning light source 100 includes a light source 110, and performs scanning in front of the vehicle, with light emitted from the light source 110. While the scanning light source 100 may include two or more light sources 110, the number of the light source(s) 110 is one in this embodiment, for the sake of easy understanding and simple description. As the light source 110, a semiconductor light source, such as a light emitting diode (LED) or a laser diode, may be used. The scanning light source 100 has a reflector (blades) 112, in addition to the light source 110. The reflector 112 receives emitted light L1 of the light source 110, and repeats predetermined periodic motion, so that reflected light L2 from the reflector 112 travels in a horizontal direction ("H" direction in FIG. 1) for scanning in front of the vehicle. In this embodiment, the reflector 112 is mounted on a rotor of a motor (not shown), and makes rotary motion. At a given point in time, a ray of light L1 incident on the reflector 112 is reflected at a reflection angle corresponding to the position of the reflector 112 (the angle of rotation of the rotor), and forms an irradiated region 300 in front of the vehicle. The irradiated region 300 has predetermined dimensions in the horizontal direction ("H" direction) and vertical direction ("V" direction).

As the reflector 112 rotates, the reflection angle changes, and the position (scan position) of the irradiated region 300 moves in repeated sweeping motions in the horizontal direction ("H" direction). This motion is repeated at a high speed, e.g., at 50 Hz or higher, so that a light distribution pattern 310 is formed in a region in front of the vehicle.

A lighting circuit 200 controls the quantity of light (luminance) of the light source 110, in synchronization with scanning of the scanning light source 100, more specifically, in synchronization with the periodic motion of the reflector 112. During scanning, the illuminance of the irradiated region 300 at each scan position is controlled, so that a range or ranges (lighted regions RON) having non-zero illuminance and a range or ranges (non-lighted regions ROFF) having zero illuminance are formed. The light distribution pattern 310 is a combination of the lighted region or regions RON and the non-lighted region or regions ROFF.

Figure 2:
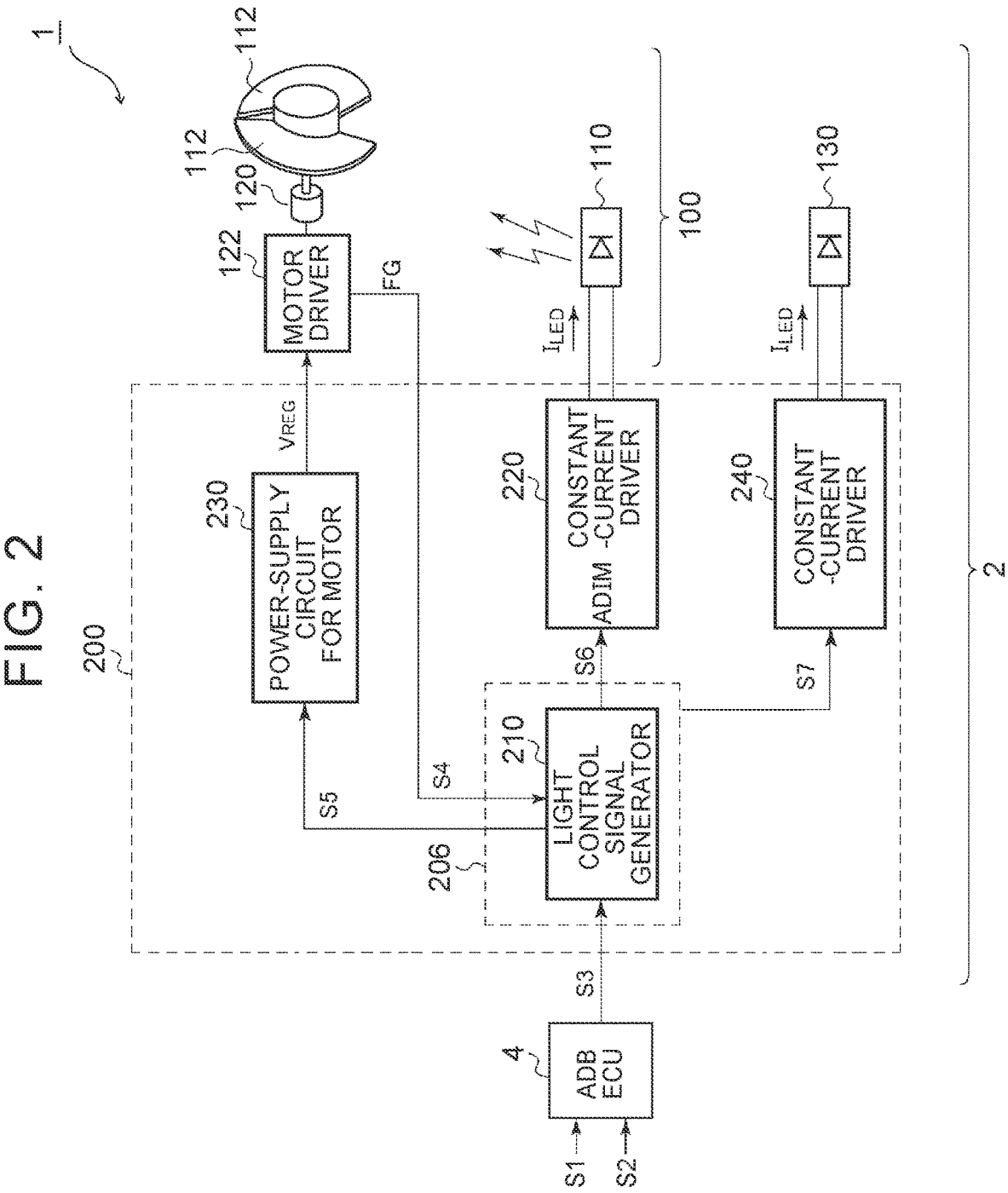
FIG. 2 is a block diagram of a lighting system including the vehicular lighting device according to the embodiment.

Next, the configuration of the lighting circuit 200 of the vehicular lighting device 2 will be described. FIG. 2 is a block diagram of the lighting system 1 including the vehicular lighting device 2 according to the embodiment. The lighting system 1 includes a vehicle-side electronic control unit (ECU) 4 and the vehicular lighting device 2.

The vehicle-side ECU 4 controls the state of the vehicular lighting device 2. More specifically, the vehicle-side ECU 4 supplies a command signal S3 including turn-on and turn-off commands of high beams and low beams, light distribution of high beams under ADB (Adaptive Driving Beam) control, and headlight flashing, to the lighting circuit 200.

Regarding light distribution control, the vehicle-side ECU 4, which is supplied with camera information S1 and vehicle information S2, detects conditions in front of the vehicle, more specifically, the presence or absence of an oncoming vehicle and a preceding vehicle, the presence or absence of a pedestrian, and so forth, based on the camera information S1. Also, the vehicle-side ECU 4 detects the current vehicle speed, steering angle, etc., based on the vehicle information S2. The vehicle-side ECU 4 determines a light distribution pattern to be formed in a region in front of the vehicle, based on these items of information, and sends the command signal S3 including information (which will be called "light distribution command data 3a") indicating the light distribution pattern, to the vehicular lighting device 2. The function of generating the light distribution pattern may be installed in the interior of the vehicular lighting device 2, for example, in an electronic control unit (ECU) of the lighting circuit 200.

When the driver performs headlight flashing operation, the vehicle-side ECU 4 sends the command signal S3 including a lighting command responsive to the flashing operation, to the vehicular lighting device 2.

The vehicular lighting device 2 includes the scanning light source 100 as a high-beam light source, a low-beam light source 130, and the lighting circuit 200.

The scanning light source 100 includes a motor 120 and a motor driver 122, in addition to the light source 110 and the reflector 112. The reflector 112 is mounted on the motor 120. As the motor 120 rotates, the incident angle (and reflection angle) of the emitted light L1 of the scanning light source 100 changes, and the reflected light L2 travels in repeated sweeping motions to scan a region in front of the vehicle. While a power-supply voltage VREG is supplied from the lighting circuit 200 to the motor driver 122, the motor driver 122 is placed in an enabled state, and rotates the motor 120 at a predetermined rotational speed. While no power-supply voltage VREG is supplied from the lighting circuit 200, the motor driver 122 is placed in a disabled state, and stops supply of drive current to the motor 120, so as to stop rotation of the motor 120. Namely, the power-supply voltage VREG is an enable signal for switching the motor driver 122 between the enabled state and the disabled state, and the enable signal is asserted when the power-supply voltage VREG is supplied, and is negated or deasserted when the power-supply voltage VREG is cut off.

The lighting circuit 200 controls turn-on and turn-off and luminance of the scanning light source 100 and low-beam light source 130, and control rotation and stop of the motor 120, according to the command signal S3 from the vehicle-side ECU 4.

The lighting circuit 200 includes a lighting ECU 206, constant-current driver 220 for high beams, power-supply circuit 230 for motor, and constant-current driver 240 for low beams.

The lighting ECU 206 includes a microcomputer, and controls the lighting circuit 200 in an integrated manner. When the lighting ECU 206 receives the command signal S3 including a low-beam lighting command, it asserts a low-beam lighting command signal S7 (set the signal S7 to HIGH, for example), and enables the constant-current driver 240. The constant-current driver 240, which is in the enabled state, supplies drive current ILED to the low-beam light source 130, and causes the light source 130 to emit a low beam.

In the following, control of the scanning light source 100 will be described. The lighting ECU 206 supplies a power-supply control signal S5 that directs generation and stop of the power-supply voltage VREG, to the power-supply circuit 230 for motor. Accordingly, rotation and stop of the motor 120 are controlled based on the power-supply control signal S5. In this embodiment, after the ignition of the vehicle is turned on, the power-supply control signal S5 is asserted (e.g., set to HIGH), in response to the first lighting command to light the light source 110, and rotation of the motor 120 is started.

The lighting ECU 206 receives a position detection signal S4, in addition to the light distribution command data S3$a$ included in the command signal S3. The position detection signal S4 is a pulse signal indicating the position of the reflector 112, in other words, the current beam scan position, and is also a rotation detection signal that is synchronized with rotation of the motor 120. For example, the position detection signal S4 may indicate times at which a given reference part of the reflector 112 passes a predetermined position. For example, the reference part may be a gap between edges of two blades of the reflector 112, or a middle portion of each blade, or any desired part.

A Hall element may be mounted on the motor 120 that rotates the reflector 112. In this case, a Hall signal from the Hall element has a periodic waveform corresponding to the position of the rotor, namely, the position of the reflector. For example, the motor driver 122 has a function of generating a pulse signal FG (Frequency Generation) indicating the timing of reversal of the polarity of the Hall signal. The FG signal may be used as the position detection signal S4.

The motor driver 122 of sensorless drive type may generate the FG signal, based on back electromotive force generated in a coil of the motor 120.

In this embodiment, the position detection signal S4 is a pulse signal having a negative edge (or a positive edge) each time the motor 120 makes one half (½) rotation. It is to be noted that, when two blades of the reflector 112 are mounted on the motor 120, the period of the position detection signal S4 coincides with the scan period of the beam.

During a normal high-beam lighting period, the lighting circuit 200 generates a light control signal S6 indicating a time waveform of the light quantity (turn-on or turn-off and luminance) of the light source 110, and lights the semiconductor light source according to the light control signal S6, so as to provide the light distribution pattern indicated by the light distribution command data S3$a$, in synchronization with rotation of the motor 120, in other words, in synchronization of the beam scan position. The above series of process steps is repeatedly performed.

A light control signal generator 210 is installed in the lighting ECU 206. During the normal lighting period, the light control signal generator 210 generates the light control signal S6, based on the command signal S3 and the position detection signal S4. The light control signal S6 may be a binary signal corresponding ON and OFF of the light source 110, or may be a multi-level signal. The light control signal S6 corresponds one-to-one with the drive current ILED that flows through the light source 110, and thus corresponds one-to-one with the light quantity of the light source 110.

As a method of changing the light quantity of the light source 110, there are analog light control (analog light reduction) and PWM (pulse width modulation) light control. In the analog light control, the current amount (amplitude) of the drive current ILED is controlled. In the PWM light control, the drive current ILED is turned on and off in a time-sharing manner, such that the ratio of the ON time is adjusted. The light control signal S6 generated by the light control signal generator 210 is supplied to an analog light control input ADIM of the constant-current driver 220. The constant-current driver 220 generates drive current ILED of which the current amount is proportional to the light control signal S6.

There is a gap between the edges of the two blades of the reflector 112, and the accuracy of mirror surfaces in end portions of each blade may be poorer than that of its middle portion. In this case, the opposite ends of each blade of the reflector 112 may not be used, and the light source 110 may be preferably turned off at the end of each scan period, irrespective of the light distribution pattern. In this embodiment, the end of each scan period corresponds to a negative edge of the position detection signal S4; therefore, the light control signal generator 210 generates the light control signal S6 that turns off the light source 110, at each negative edge of the position detection signal S4, during the normal lighting period.

When the lighting circuit 200 receives a headlight flashing command, it turns on the light source 110 while ignoring a non-irradiated region or regions included in the light distribution command data S3$a$, and irradiates the whole range excluding the end of each scan period (namely, an end portion of the light distribution pattern) with light.

FIG. 3A to FIG. 3C are useful for describing generation of the light control signal S6. As shown in FIG. 3A, the light distribution command data S3$a$ is provided in the form of angle information, for example. In this example, θ0 denotes the left end, and θ MAX denotes the right end, while values θa, θb, θc, θd, θe, and θf specify boundaries between irradiated regions and non-irradiated regions. The upper limit of the number of non-irradiated regions may be set.

FIG. 3B shows a time waveform of the scan angle of the scanning light source 100. The period of the scan angle corresponds to the period of the position detection signal S4.

The angle θ at a given point in time t is expressed by Eq. (1) as follows, where Ts is the scan period, and ti is the start time of the i-th scan cycle.

$$\theta(t)=\theta 0+(\theta \text{ MAX}-\theta 0)/Ts\times(t-ti) \qquad \text{Eq. (1)}$$

In the i-th scan cycle, time t at which the emitted beam (target region 300) of the light source 110 is radiated at a given angle θ is expressed by Eq. (2) as follows.

$$t=(\theta-\theta 0)Ts/(\theta \text{ MAX}-\theta 0)+ti \qquad \text{Eq. (2)}$$

According to Eq. (2) above, times ta to tf corresponding to θa to θf, respectively, are calculated. Then, in each scan cycle, the light control signal S6 of which the signal level changes at times ta to tf thus calculated is supplied to the constant-current driver 220, so that the time waveform of the light quantity of the light source 110 is controlled. In this manner, the light distribution pattern corresponding to the light distribution command data S3a of FIG. 3A can be formed.

Here, the scan period Ts changes according to the rotational speed of the motor 120; therefore, it varies with time. Thus, in order to achieve accurate light distribution control, it is necessary to measure the scan period Ts for each scan cycle, and reflect it in generation of the light control signal.

FIG. 4 shows the control sequence of the light source during stable rotation of the motor. In FIG. 4, the motor rotates at a target speed. Tsi denotes the scan period in the i-th scan cycle. As described above, the motor driver 122 is configured to be able to output a rotational speed detection (FG) signal in the form of pulses, of which the level changes each time the rotor rotates a predetermined electric angle (or mechanical angle). The FG signal can be grasped as the position detection signal S4 indicating the position of the rotor of the motor. In FIG. 4, the FG signal has a negative edge at the end of each scan period.

The scan period Tsi measured in the i-th scan cycle is used in light source control in the cycle after next.

Initially, the period Tsi is measured in the i-th scan cycle. The period Tsi can be measured by measuring an interval of adjacent negative edges of the FG signal by use of a counter. In the next (i+1)-th scan cycle, parameters (ta to tf in FIG. 4) needed for the light control signal of the light source are computed, using the period Tsi measured immediately before this cycle. When the light quantity is changed among multiple levels, as well as turn-on and turn-off of the light, each of the parameters may include the current amount at each point in time, and the gradient of the current amount with respect to time.

Then, in the next (i+2)-th scan cycle, the light control signal S6 is generated based on the parameters computed in the previous cycle, and the light source is controlled.

FIG. 5 shows the control sequence of the light source at the start of rotation of the motor. The period $Ts_1$ is measured in the first cycle, and computation of the parameters PARAM is started in the second cycle. Finally, in the third cycle, the light source can be controlled based on the parameters PARAM. Accordingly, the light source cannot be controlled in at least the leading two cycles.

Suppose the headlight flashing operation is performed while the motor is stopped (during the stop period). In this case, if the light source is controlled according to the control sequence of FIG. 4, the light source cannot be turned on in the leading two cycles. While the length of the two cycles after start of rotation of the motor depends on the type of the motor, it is approximately several hundreds of milliseconds, and reaction to the flashing operation is delayed.

If the motor is designed so as to start rotating upon turn-on of the ignition, and then keep rotating until the ignition is turned off, namely, if the motor rotates all the time, the light source can be turned on at the same time as the headlight flashing operation, resulting in improved response to the flashing operation. However, the reflector keeps rotating, at any time of day or night, and the life of the motor may be shortened.

In the following, control in relation to headlight flashing will be described. Referring back to FIG. 2, when the lighting ECU 206 of the lighting circuit 200 receives a headlight flashing command during a stop period of the motor 120, it asserts the power-supply control signal S5, and starts rotating the motor 120. At the same time, the lighting ECU 206 continuously lights the light source 110, asynchronously with rotation of the motor 120, in other words, with no relation to the position detection signal S4, during a start-up period that precedes the normal lighting period. Namely, when the light control signal generator 210 receives the headlight flashing command during the stop period of the reflector 112, it generates the light control signal S6, so that the light source 110 is kept activated (ON) even at the end of each scan period, during the start-up period. Namely, the non-lighting period tx that is inserted at the end of each scan period is eliminated.

The headlight flashing operation is performed during the stop period of the motor 120, for example, when the first lighting of the lighting device after turn-on of the ignition is caused by the headlight flashing operation. For example, it may be the case where the headlight flashing operation is performed while the vehicle is traveling with the light source 110 placed in the OFF state, in the daytime.

When the lighting ECU 206 receives a normal (non-flashing ADB) lighting command, rather than the headlight flashing operation, during the stop period of the motor 120, it asserts the power-supply control signal S5, and starts rotating the motor 120. At the same time, the lighting ECU 206 keeps the light source 110 in the OFF state over a given number of scan cycles, and then proceeds to the normal lighting period.

If the motor 120 is kept rotated after the light source 110 is turned off, the life of the motor 120 may be affected. Thus, in the daytime when the frequency of use of high beams is low, the lighting ECU 206 may negate the power-supply control signal S5, and stop rotation of the motor 120, after a lapse of a predetermined time (e.g., 10 sec.) after the light source 110 is turned off (first mode). On the contrary, in the night-time when the frequency of use of high beams is high, it is preferable to keep rotating the motor 120, even after the high beams are turned off (second mode). The first mode and the second mode may be switched by time of day.

In another example, the first mode and the second mode may be associated with the state of the low-beam light source 130. Namely, while the low-beam light source 130 is in the OFF state, the motor 120 is controlled in the first mode, since the frequency of use of high beams is low. On the contrary, while the low-beam light source 130 is in the ON state, the frequency of use of high beams is high; therefore, the second mode is selected, and the motor 120 is kept rotated even after the light source 110 is turned off. In this case, when a lighting command for the low-beam light source 130 is generated before a lighting command for high beams or headlight flashing is generated, the power-supply control signal S5 may be asserted, in response to the preceding lighting command for the low-beam light source 130, and rotation of the motor 120 may be started. After a lapse of a predetermined time (e.g., 10 sec.) after the low-beam light source 130 is turned off, the power-supply control signal S5 may be negated, and the motor 120 may be stopped.

Switching between the first mode and the second mode may be associated with turn-on and turn-off of a position lamp (not shown), in place of turn-on and turn-off of the low-beam light source 130.

Figure 6:
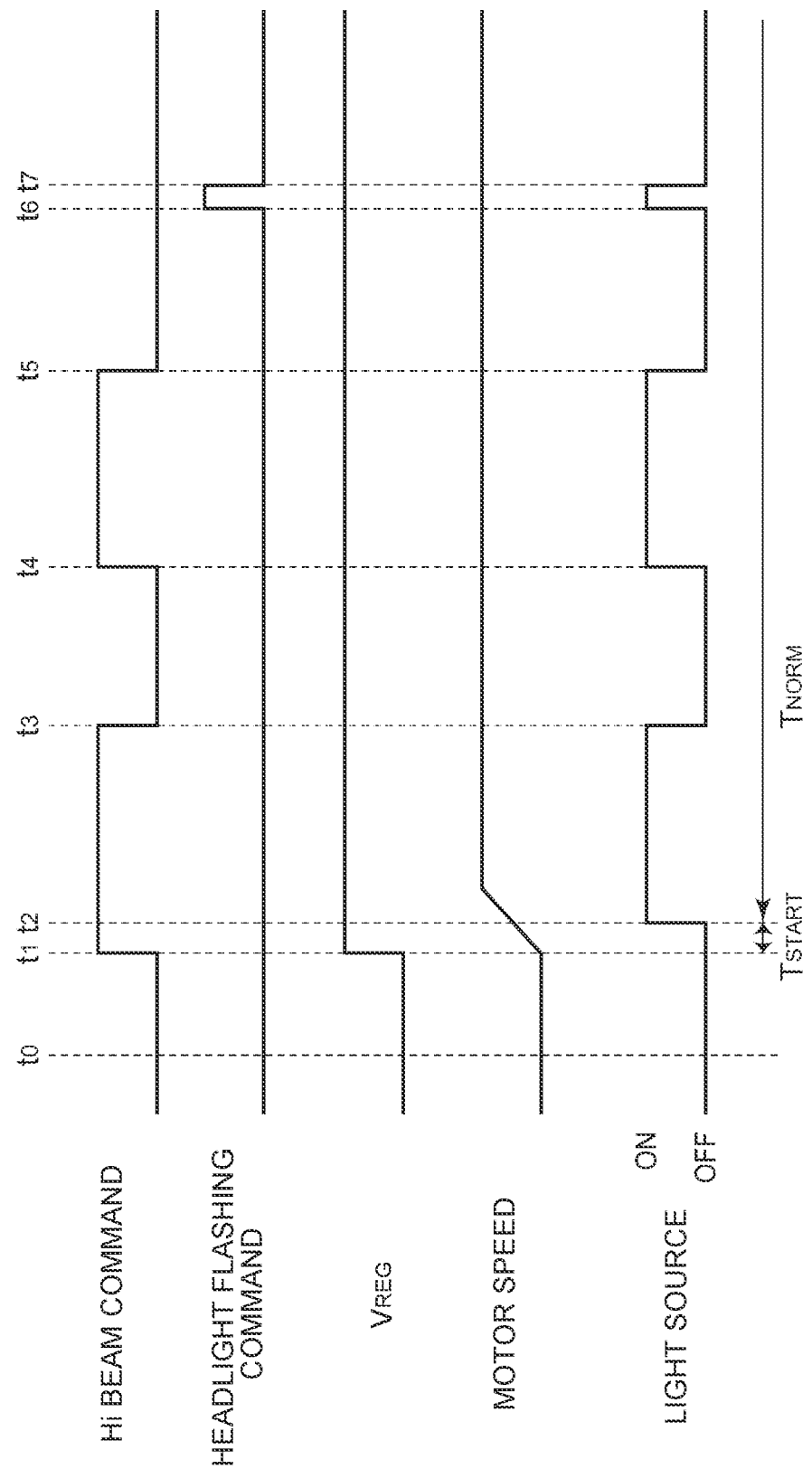
FIG. 6 is a time chart describing operation of the vehicular lighting device of FIG. 2.

The configuration of the vehicular lighting device 2 has been described above. Next, its operation will be described. Initially, normal ADB lighting control will be described. FIG. 6 is a time chart describing operation of the vehicular lighting device 2 of FIG. 2. At time t0, the driver turns on the ignition. Then, the vehicular lighting device 2 is placed in the OFF state for a while.

At time t1, the driver turns on a high beam of the vehicular lighting device 2. In response to a high-beam lighting command, the power-supply voltage VREG is supplied to the motor driver 122, and rotation of the motor 120 is started. At time t2 at which the start-up period TSTART ends, the normal lighting period TNORM starts, and the light source 110 is turned on. At time t3, the light source 110 is turned off, in response to a high-beam turn-off command.

When a high-beam lighting command is generated again at time t4, the light source 110 is immediately turned on at this time. Then, when a turn-off command is generated at time t5, the light source 110 is immediately turned off.

When a lighting command for headlight flashing is generated at time t6, the light source 110 is immediately turned on. When a turn-off command for flashing is generated at time t7, the light source 110 is immediately turned off.

Figure 7A:
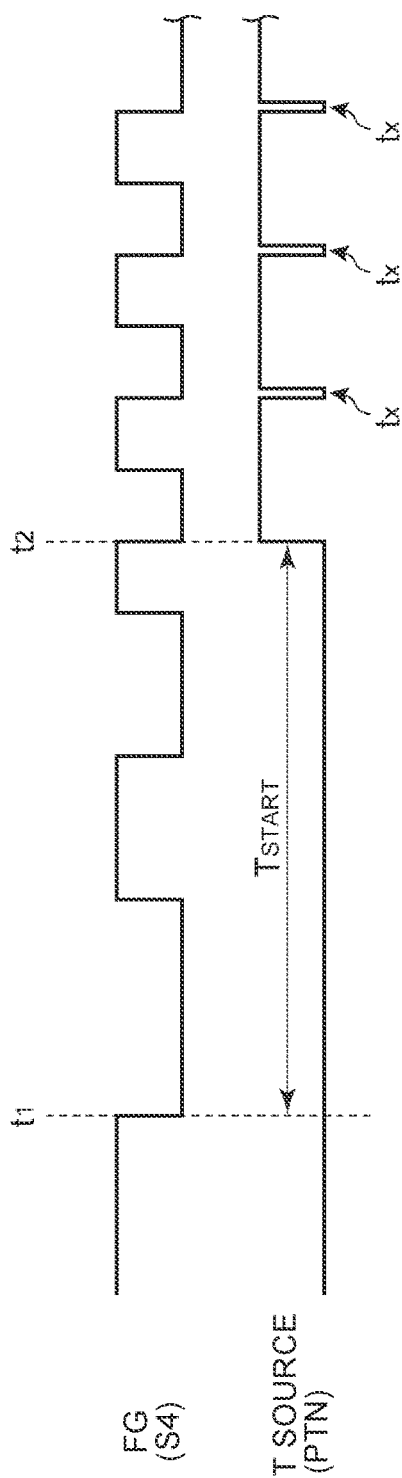
FIG. 7A to FIG. 7C are waveform diagrams showing details of high-beam lighting and headlight flashing in the time chart of FIG. 6.
Figure 7B:
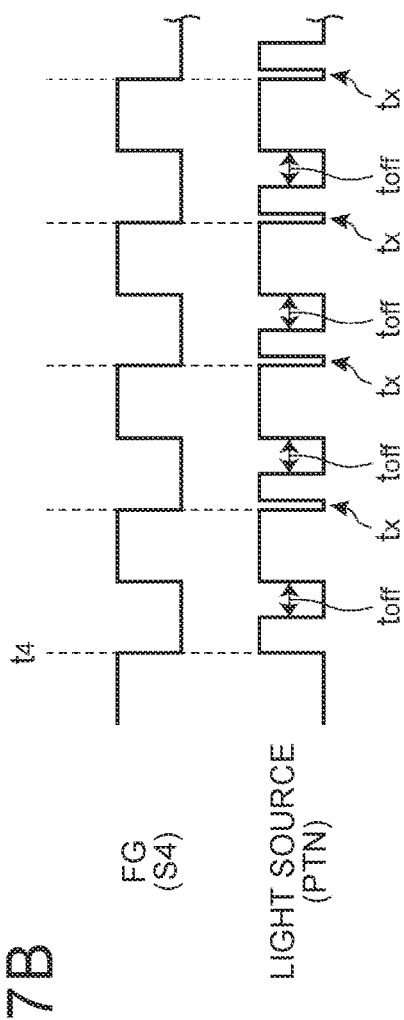
Figure 7C:
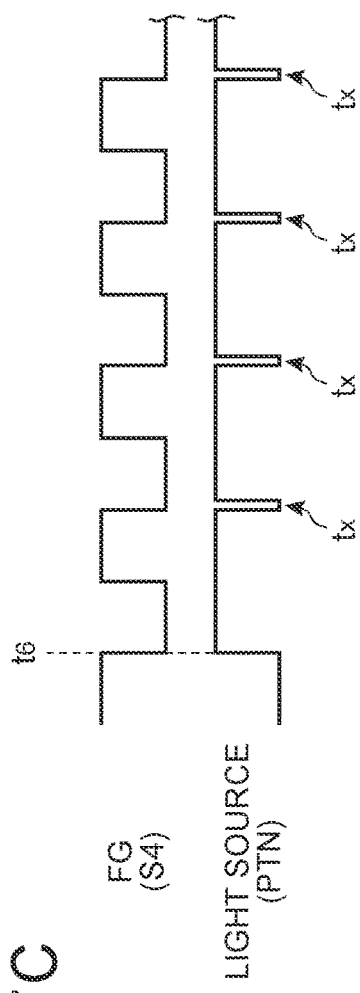

FIG. 7A to FIG. 7C are waveform diagrams indicating details of high-beam lighting and headlight flashing in the time chart of FIG. 6. FIG. 7A shows the first high-beam lighting in FIG. 6. Prior to time t1, the motor 120 is stopped, and the FG signal is kept at a constant level. When the motor 120 starts rotating at time t1, the FG signal becomes a pulse signal. As described above referring to FIG. 4, in the start-up period TSTART corresponding to two cycles immediately after start of rotation of the motor 120, the light source 110 is in the OFF state. When the start-up period TSTART ends at time t2, the normal lighting period starts, and turn-on and turn-off of the light source 110 are repeatedly controlled for each scan period, in synchronization with the FG signal (position detection signal S4). During the first high-beam lighting, the ADB function is disabled (OFF), and there are no non-irradiated regions; therefore, the light source 110 is turned off, only during a short non-lighting period tx at the end of each scan period. The short non-lighting period tx may extend over the corresponding negative edge of the FG signal.

FIG. 7B shows the second high-beam lighting in FIG. 6. At time t4, the rotational speed of the motor 120 is stable, and it is in the normal lighting period. Thus, when a high-beam lighting command is generated at time t4, turn-on and turn-off of the light source 110 are repeatedly controlled for each scan period, in synchronization with the FG signal (position detection signal S4). During the second high-beam lighting, the ADB function is in effect. In this example, one non-lighting period toff is inserted, and the light source 110 is turned off in the non-lighting period toff designated by the light distribution command data S3a, in addition to the short turn-off period tx at the end of each scan period.

FIG. 7C shows headlight flashing in FIG. 6. At time t6, the rotational speed of the motor 120 is stable, and it is in the normal lighting period. Thus, when a command for headlight flashing is generated at time t6, turn-on and turn-off of the light source 110 are repeatedly controlled for each scan period, in synchronization with the FG signal (position detection signal S4). In this example, the light source 110 is in the OFF state in a short period tx at the end of each scan period, and the light source 110 is in the ON state in periods other than the short periods tx.

FIG. 8 is another time chart describing operation of the vehicular lighting device 2 of FIG. 2. At time t0, the driver turns on the ignition. Then, the vehicular lighting device 2 is placed in the OFF state for a while.

At time t1, the driver generates a command for headlight flashing. In response to the command for headlight flashing, the power-supply voltage VREG is supplied to the motor driver 122, and the motor 120 starts rotating. The light source 110 is turned on at the same time that the motor 120 starts rotating. Namely, for the headlight flashing, the light source 110 is turned on during the start-up period TSTART.

At time t2 at which the start-up period TSTART ends, the normal lighting period TNORM starts. When a flashing turn-off command is generated at time t3, the light source 110 is turned off.

In the example of FIG. 8, the low beam is in the OFF state, and the first mode is selected for control of the motor. Accordingly, at time t4 after a lapse of a predetermined time from time t1, the power-supply control signal S5 is negated, and rotation of the motor 120 is stopped.

When the driver generates a command for headlight flashing again at time t5, the same control as that in a period from time t1 to t3 is repeated in a period from time t5 to t7.

Figure 9:
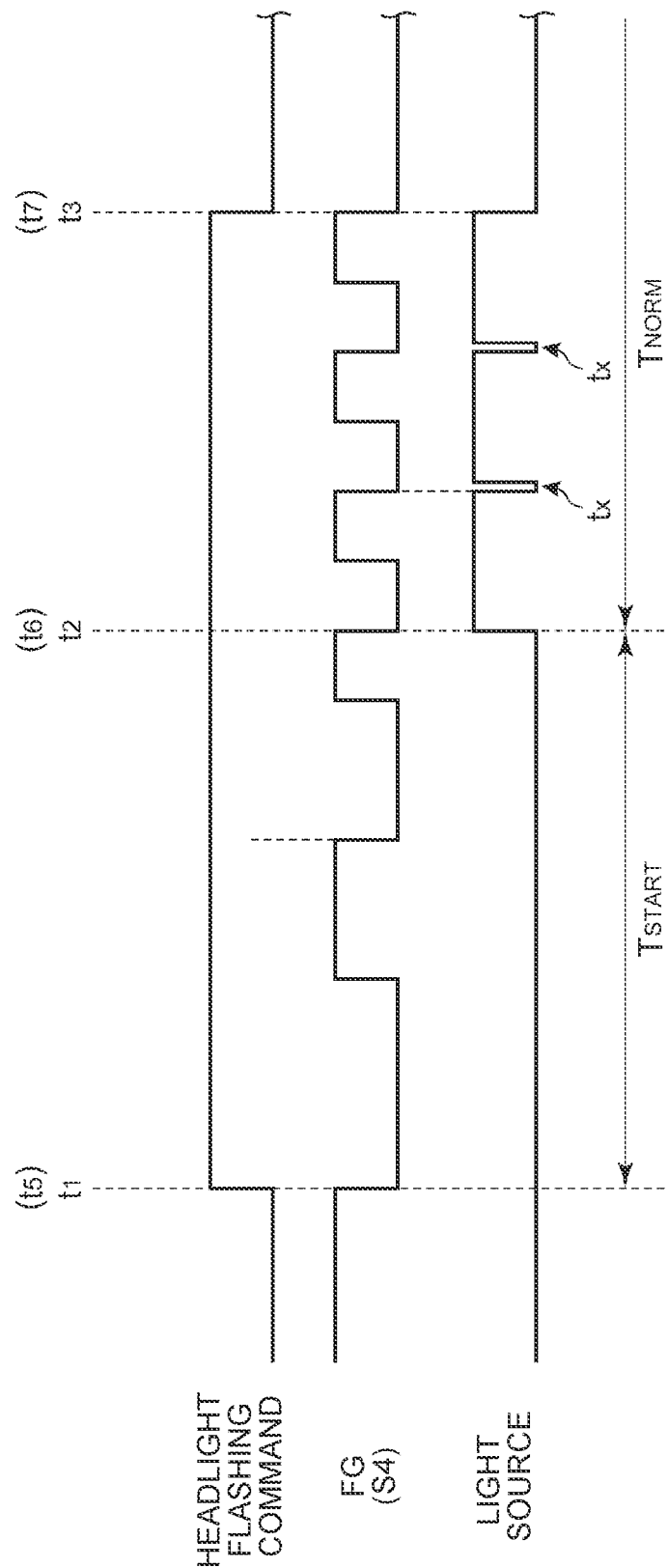
FIG. 9 is a waveform diagram showing details of headlight flashing in the time chart of FIG. 8.

FIG. 9 is a waveform diagram showing details of headlight flashing in the time chart of FIG. 8. Prior to time t1 (t5), the motor 120 is stopped, and the FG signal is kept at a constant level. When the motor 120 starts rotating at time t1 (t5), the FG signal becomes a pulse signal. The lighting ECU 206 continuously lights the light source 110, during the start-up period TSTART. During the start-up period TSTART, the position detection signal S4 is ignored, and no non-lighting period tx is inserted at the end of each scan period. When the normal lighting period TNORM starts at time t2 (t6), the lighting ECU 206 lights the light source 110 in synchronization with the FG signal (position detection signal S4). Namely, during the normal lighting period TNORM, the non-lighting period tx is generated at the end of each scan period. When the command for headlight flashing turns LOW at time t3 (t7), the light source 110 is turned off.

The operation of the vehicular lighting device 2 has been described above. With the vehicular lighting device 2 thus operated, the response to the headlight flashing operation performed during the stop period of the motor 120 can be improved.

The disclosure has been described on the basis of the embodiment. It is to be understood by those skilled in the art that this embodiment is merely exemplary, its constituent elements and process steps may be combined as appropriate to provide various modified examples, and that the modified examples are also within the range of the disclosure. The modified examples will be described below.

First Modified Example

The method of generating the position detection signal S4 is not limited to that using the Hall element. For example, the position detection signal S4 may be generated, by using a rotary encoder or resolver of optical type, or other type, for detecting the position of the rotor of the motor 120. In another example, the vehicular lighting device 2 may include a photosensor provided on the rear side of the reflector 112, and a light source for position detection, which emits light from the front side of the reflector 112, toward the photosensor. Then, the reflector 112 may be provided with a slit or pinhole. With this arrangement, the timing of passage of the slit or pinhole over the photosensor can be detected. The slit may be a gap between two blades of the reflector 112. As the light source for position detection, an infrared light source, or the light source 110 may be used. Thus, there is a variety of methods for producing the position detection signal S4.

Second Modified Example

While the two cycles from the start of rotation of the motor 120 provide the start-up period TSTART in the illustrated embodiment, the start-up period TSTART may be longer than the two cycles. For example, the start-up period TSTART may consist of three cycles, or four cycles, from the start of rotation.

Third Modified Example

While the reflector 112 consists of two blades in the illustrated embodiment, the number of the blade(s) is not limited to this, but may be one, or three or more. Also, while the reflector 112 makes rotary motion in the illustrated embodiment, the reflector 112 may make reciprocating motion.

Fourth Modified Example

As the light source 110, a semiconductor light source, such as a laser diode (LD) or organic electroluminescence (EL), other than the LED, may be used.

Fifth Modified Example

Figure 10A:
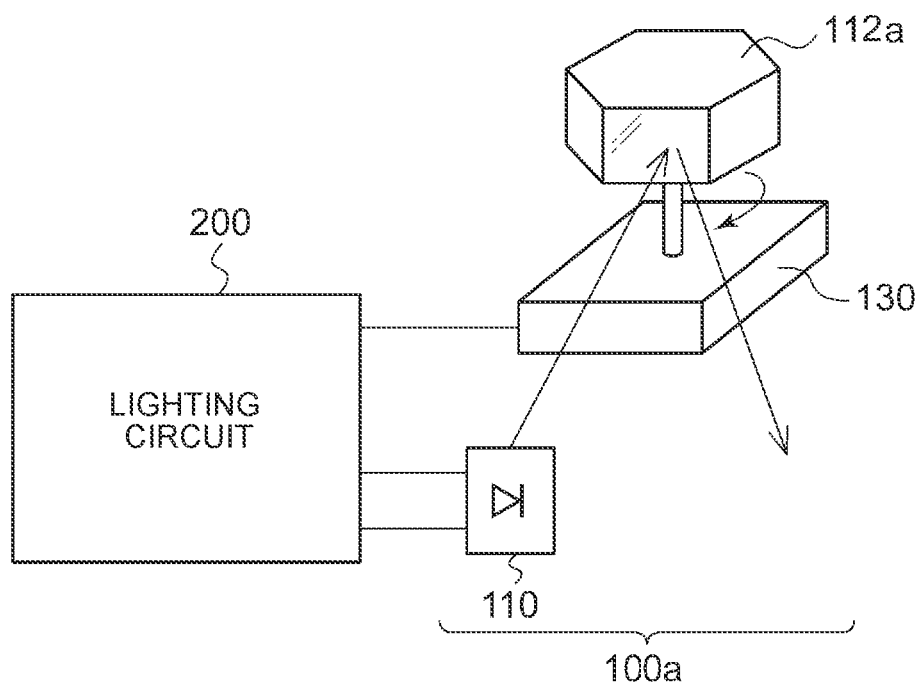
FIG. 10A and FIG. 10B are views showing modified examples of scanning light sources.
Figure 10B:
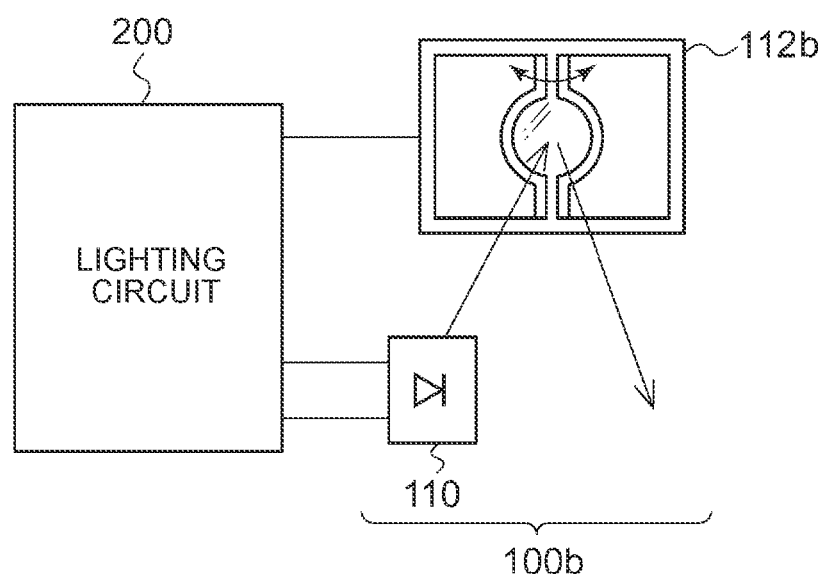

There is a variety of modified examples of the configuration of the scanning light source 100. While the blades are used as the reflector 112 in the illustrated embodiment, the reflector is not limited to this. FIG. 10A and FIG. 10B show modified examples of the scanning light source 100. Like the scanning light source 100 of FIG. 1, each of the scanning light sources 100a, 100b of FIG. 10A and FIG. 10B is a combination of the light source 110 and a reflector 112a or 112b. The reflector 112a of FIG. 10A is a polygon mirror. The reflector 112a may also be a galvanometer mirror. The reflector 112b of FIG. 10B is a MEMS (Micro Electro Mechanical Systems) scan mirror.

Sixth Modified Example

Figure 11A:
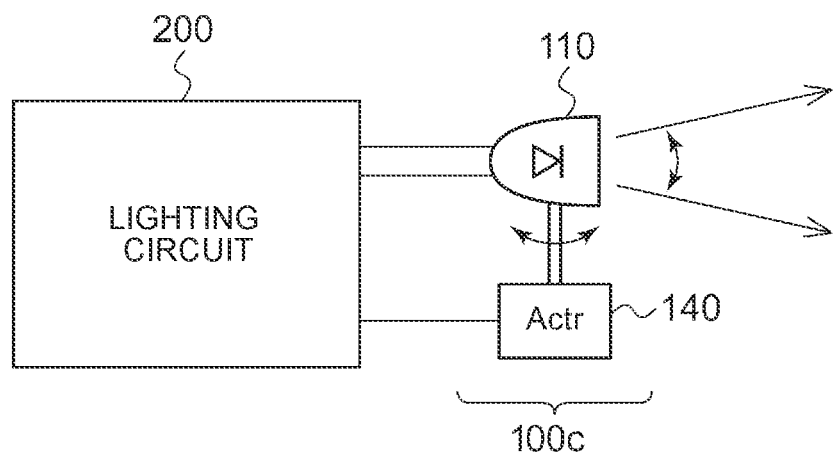
FIG. 11A and FIG. 11B are block diagrams of lighting systems having scanning light sources according to a sixth modified example.
Figure 11B:
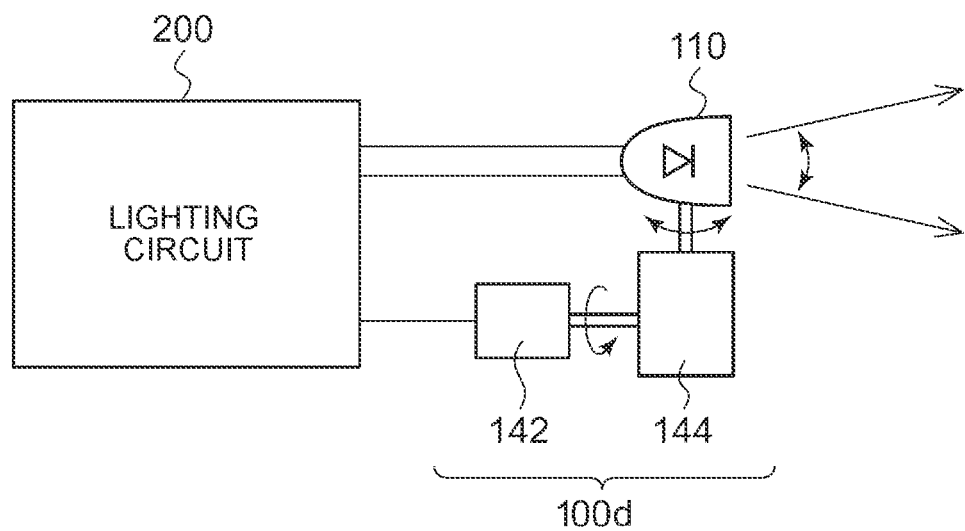

FIG. 11A and FIG. 11B are block diagrams of lighting systems including scanning light sources 100c, 100d, respectively, according to a sixth modified example. In the scanning light source 100c of FIG. 11A, an actuator 140 is mounted on the light source 110, and the optical axis of the light source 110 can swivel (or perform leveling) by means of the actuator 140.

The scanning light source 100d of FIG. 11B includes a motor 142 and a converting device 144, in place of the actuator 140. The converting device 144 receives rotary motion of the motor 142, converts it into reciprocating motion, and outputs the reciprocating motion. The optical axis of the light source 110 can swivel, due to the reciprocating motion delivered from the converting device 144.

While the disclosure has been described, using specific terms, based on the embodiment, the embodiment merely illustrates the principle and application of the disclosure, and many modified examples of the embodiment and change of locations or arrangements may be permitted, without departing from the concept of the disclosure specified in the appended claims.

What is claimed is:

1. A vehicular lighting device comprising:
  a scanning light source that includes a semiconductor light source and a motor, and is configured to scan a region in front of the lighting device, with light emitted from the semiconductor light source, in accordance with motion of the motor; and
  a lighting circuit configured to change a light quantity of the semiconductor light source in synchronization with the motion of the motor, during a normal lighting period, so as to obtain a predetermined light distribution pattern, wherein
  the lighting circuit is configured to start the motion of the motor, in response to a lighting command for headlight flashing during a stop period of the motor, and continuously light the semiconductor light source asynchronously with the motion of the motor, during a start-up period that precedes the normal lighting period.

2. The vehicular lighting device according to claim 1, wherein the lighting circuit is configured to turn off the semiconductor light source at an end of each scan period, during the normal lighting period, and keep the semiconductor light source lighted at the end of each scan period, during the start-up period.

3. The vehicular lighting device according to claim 1, wherein the start-up period includes a predetermined number of scan periods after start of the motion of the motor.

4. The vehicular lighting device according to claim 1, wherein the lighting circuit is configured to start the motion of the motor, in response to a normal lighting command during the stop period of the motor, and place the semiconductor light source in an off state during the start-up period.

5. The vehicular lighting device according to claim 1, wherein:
  the motor is of rotary type; and
  the scanning light source further includes a reflector mounted on the motor.

* * * * *